Figure 1:
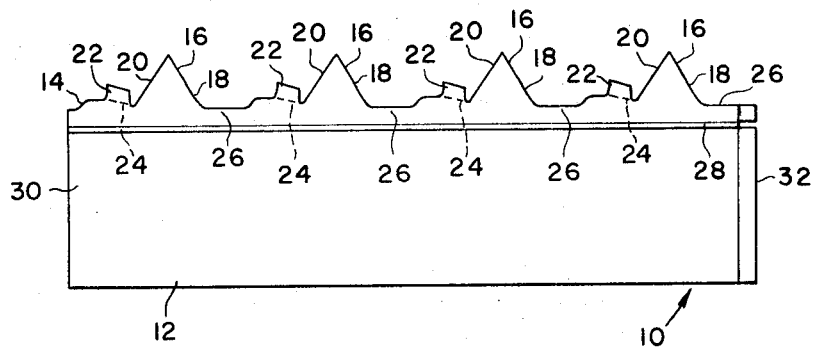

United States Patent [19]
Grim et al.

[11] 3,726,545
[45] Apr. 10, 1973

[54] AIR DUCT CONNECTOR

[75] Inventors: John R. Grim; Alan D. Hunter, both of Clarksville, Tenn.

[73] Assignee: The Trane Company, La Crosse, Wis.

[22] Filed: May 21, 1971

[21] Appl. No.: 145,738

[52] U.S. Cl. ..................285/3, 30/301, 285/40, 285/201
[51] Int. Cl. ..........................F16l 15/00, F16l 41/00
[58] Field of Search ..................29/432; 30/301, 310; 285/3, 4, 40, 158, 201, 205, 206, 208, 209

[56] References Cited

UNITED STATES PATENTS

| | | | |
|---|---|---|---|
| 477,308 | 6/1892 | McFarland | 285/209 X |
| 552,408 | 12/1895 | Barnes | 285/209 X |
| 766,083 | 7/1904 | Watts | 285/209 X |
| 1,006,008 | 10/1911 | Ross | 285/158 X |
| 3,477,745 | 11/1969 | Williams et al. | 285/40 |

*Primary Examiner*—David J. Williamowsky
*Assistant Examiner*—David H. Corbin
*Attorney*—Robert E. Lowe, Carl M. Lewis and Arthur O. Andersen

[57] ABSTRACT

An air duct connector for connecting a duct to a wall of a larger air duct or plenum chamber which is formed of reinforced fiberglass or the like. The leading edge of the connector is provided with cutting teeth for initially forming a circular aperture in the reinforced fiberglass wall and radially extending tabs which may be threaded into the aperture to lock the connector to the wall.

6 Claims, 5 Drawing Figures

PATENTED APR 10 1973

3,726,545

SHEET 1 OF 2

INVENTOR.
JOHN R. GRIM
ALAN D. HUNTER
BY
Carl M. Lewis
ATTORNEY

AIR DUCT CONNECTOR

Many types of conduit connectors are available for connecting the end of a conduit to a wall.

The instant invention relates to a special purpose connector used for connecting an air conveying duct to another duct or plenum chamber formed of relatively thick material which is capable of being cut such as reinforced fiberglass board.

The connector is provided with self-cutting teeth and self-threading tabs for forming an aperture in the wall and locking the connector in place within the aperture.

The one piece connector is simple and low in cost and eliminates the need for precutting an aperture and providing separate locking means.

More specifically this invention relates to a duct connector comprising: a cylindrical member having at one end a plurality of circumferentially spaced first protrusions extending axially therefrom which define cutting teeth; each of said cutting teeth having a cutting edge facing in a common direction about the axis of said cylindrical member whereby the cutting edges of said plurality of protrusions are adapted to cut simultaneously upon rotation of said cylindrical member in a first direction about said axis; and a plurality of second protrusions interspersed between said first protrusions, said second protrusions extending radially outward at said one end of said cylindrical member and having a pitch with respect to said axis of said cylindrical member whereby upon rotation within an aperture formed by said cutting teeth in an opposite direction said second protrusions thread themselves into said aperture.

Figure 2:
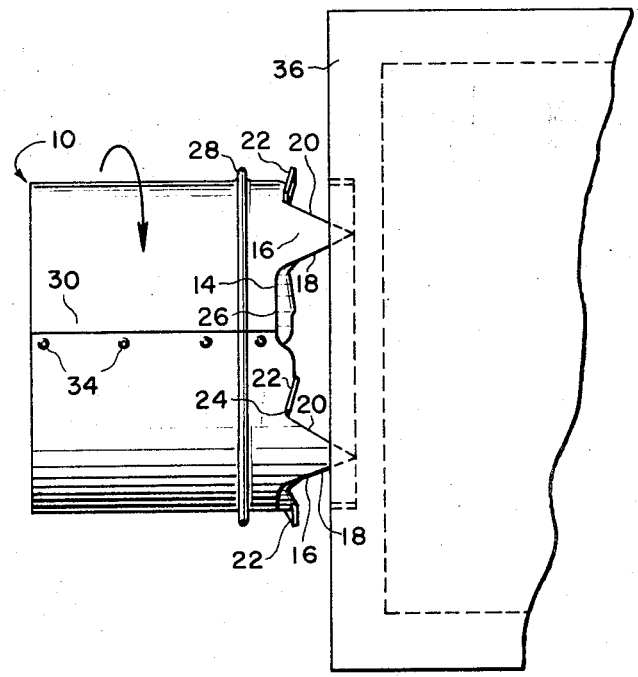
Figure 3:
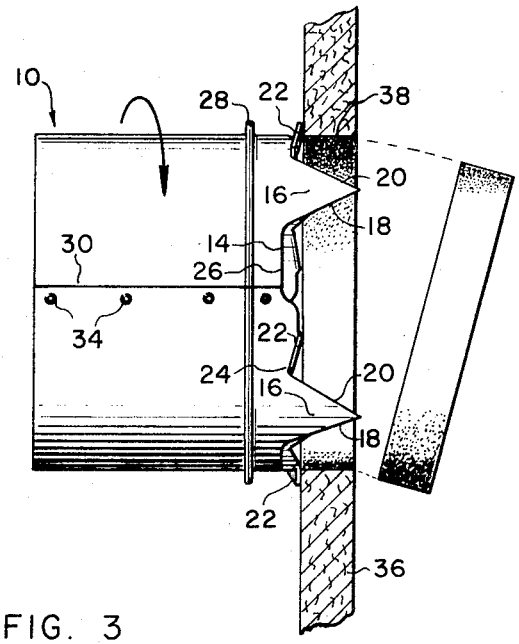
Figure 4:
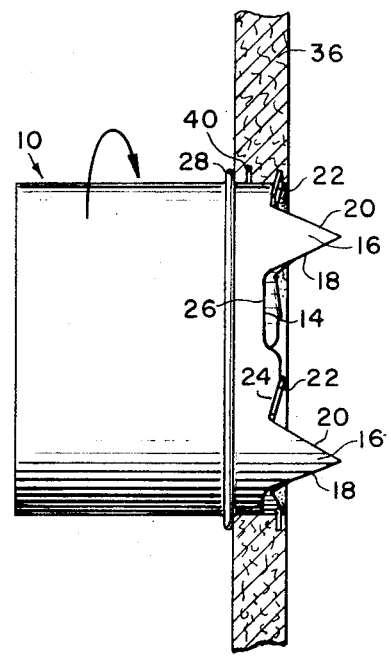
Figure 5:
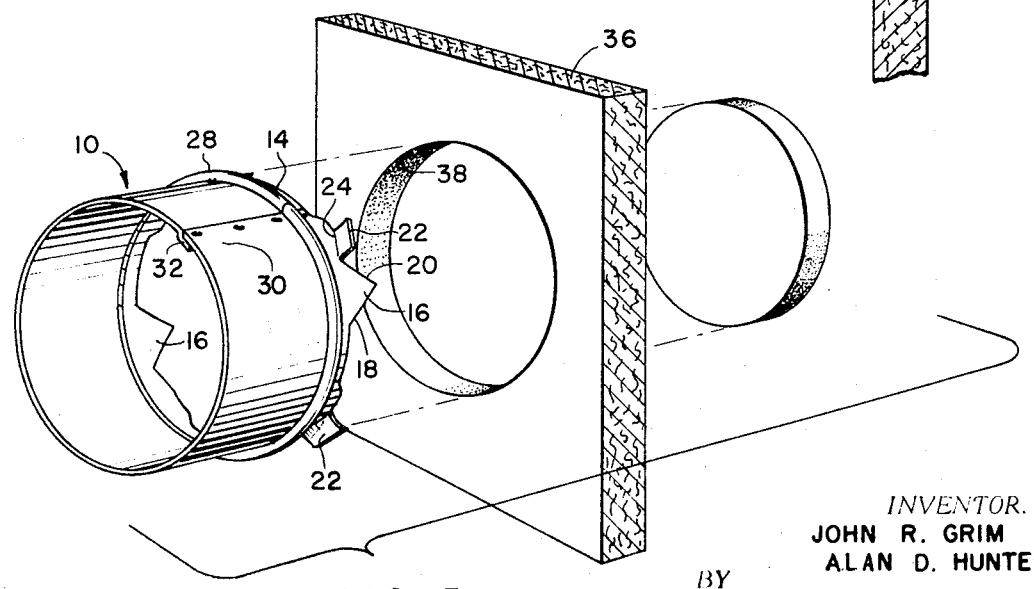

Other objects and advantages of the invention will become apparent as this specification proceeds to describe the invention with reference to the drawings in which:

FIG. 1 shows the sheet metal duct connector prior to being formed into an annulus, FIG. 2 shows the duct connector of FIG. 1 after it has been formed into an annulus and being rotated to cut an aperture in the wall of an air chamber, FIG. 3 shows the connector of FIG. 2 in relation to the chamber wall as the cutting step is completed, FIG. 4 shows the position of the connector of FIG. 3 as the threading step is completed to lock the connector onto the chamber wall, and FIG. 5 is merely a perspective of the connector and wall aperture which more clearly illustrates the shape of the connector.

Now referring to the drawings it will be seen that connector 10 as seen in FIG. 1 is formed entirely from a sheet metal blank 12 having at the leading edge 14 a first series of protrusions 16 each protrusion of which is pointed and has oppositely inclined first and second edges 18 and 20 respectively extending from the point to the main body of the blank 12. Protrusions 16 define cutting teeth the purpose and use of which will be more fully explained hereinafter.

Connector blank 10 also has at its leading edge 14 a second series of protrusions 22 which do not extend outwardly as far as protrusions 16. Each protrusion has an inclined base 24 disposed outwardly of the base 26 of protrusions 16. The protrusions 22 are subsequently bent along an inclined base 24 toward one side of the blank 12 to define a self-threading tab as will hereinafter be described.

Blank 12 also has a single undulation 28 extending outwardly from said one side of blank 12 spaced a short distance from the leading edge 14 the purpose and use of which will hereinafter become apparent.

After the blank 12 is provided with the undulation 28 and bent tabs 22, it is rolled into a cylindrical annulus by bringing the ends 30 and 32 thereof together in overlapping relation which are connected by spot welding as at 34. End 32 may be offset as seen in FIG. 5 so that the exterior of the annulus is relatively smooth. The undulation 28 and protruding tabs 22 extend radially outwardly of the annulus. If desired undulation 28 may be formed at the same time blank 12 is rolled into a cylindrical annulus. Also tabs 22 may be bent by hand along the inclined base 24 just prior to the use of the connector.

The connector is used in the following manner. The protrusions or cutting teeth 16 are brought into contact with the surface of a reinforced fiber glass duct or plenum chamber wall 36. The connector 10 is rotated about its axis in the direction indicated by the vector in FIG. 2 while advancing it into the wall 36 causing the first edge 18 of teeth 16 to cut into the wall 36 thereby forming an aperture in wall 36 as seen in FIG. 3. The section of wall plug removed may be allowed to remain in the duct or plenum chamber or may be removed through the aperture 38 and connector 10 as desired.

The connector is then rotated in the reverse direction whereby radially extending self-threading tabs or threads 22 bite into the margins of aperture 38. Because the base and thus the plane of each tab 22 is inclined to the axis of the connector, the tabs cause the connector to advance into the wall 36 by forming threads 40 in the wall 36 until the undulation 28 which forms a shoulder on connector 10 comes into contact with wall 36, as will be seen in FIG. 4. Slight additional turning of connector 10 compresses the material of wall 36 between tabs 22 and shoulder 28 thereby locking the connector in place. Any of various types of ducts may then be connected to connector 10 to provide fluid communication between such duct and the interior of the duct or chamber having wall 36.

Thus it will be seen that the invention provides an extremely simple and low cost means of connecting a duct to a wall with minimum effort and tools. The joint is secure and extremely useful in many air conditioning applications where ducts must be connected to walls formed of cuttable material.

It is understood that the above-described embodiment is illustrative of the principles of the invention. Varied other embodiments could be devised in accordance with these principles by those skilled in the art without departing from the spirit and scope of the invention.

What we claim is:

1. A duct connector for connecting a duct to a wall comprising: a sheet metal cylindrical tubular member having at one end an annular end margin, said end margin including a plurality of circumferentially spaced first protrusions extending axially and defining cutting teeth, each of said cutting teeth having a cutting edge facing in a common direction about the axis of said cylindrical member, said cutting edges of said plurality of first protrusions being adapted to cut simultaneously upon rotation of said cylindrical member in said common direction about said axis such that when said first protrusions are advanced into the wall the rotation of said cylindrical member about said axis causes the cutting teeth to cut into the wall and form an aperture therethrough, said annular end margin further including a plurality of circumferentially spaced second protrusions, each of said second protrusions being axially spaced from the leading ends of said first protrusions and extending radially outward relative to said first protrusions and said axis of said cylindrical member, each of said second protrusions having a pitch with respect to said axis of said cylindrical member to define a self-threading tab, the pitch of said second protrusions being such that when said cylindrical member is rotated about said axis said second protrusions are adapted to thread into the wall surrounding the aperture formed by said cutting edges of said first protrusions to thereby secure said cylindrical member to the wall.

2. The apparatus as defined by claim 1 wherein said cylindrical member has a radially outwardly protruding undulation along a circumferentially extending line spaced axially inward from said one end for locking said duct connector in place by abutment of a shoulder of said undulation with the rim of said aperture.

3. The apparatus as defined by claim 1 wherein said first protrusions are interspersed between said second protrusions.

4. The apparatus as defined by claim 1 wherein said second protrusions are substantially rigid.

5. The apparatus as defined by claim 4 wherein said second protrusions are rigidly supported along a major portion of their length circumferentially of said tubular member.

6. A duct connector for connecting a duct to a wall comprising: a sheet metal cylindrical tubular member having at one end an annular end margin, said end margin including a plurality of circumferentially spaced first protrusions extending axially and defining cutting teeth, each of said cutting teeth having a cutting edge facing in a common direction about the axis of said cylindrical member, said cutting edges of said plurality of first protrusions being adapted to cut simultaneously upon rotation of said cylindrical member in said common direction about said axis such that when said first protrusions are advanced into the wall the rotation of said cylindrical member about said axis causes the cutting teeth to cut into the wall and form an aperture therethrough, said annular end margin further including a plurality of circumferentially spaced second protrusions, each of said second protrusions being axially spaced from the leading ends of said first protrusions and extending radially outward relative to said first protrusions and said axis of said cylindrical member, each of said second protrusions having a pitch with respect to said axis of said cylindrical member to define a self-threading tab, the pitch of said second protrusions being such that when said cylindrical member is rotated about said axis in a direction opposite said common direction said second protrusions are adapted to thread into the wall surrounding the aperture formed by said cutting edges of said first protrusions to thereby secure said cylindrical member to the wall.

* * * * *